(12) United States Patent
Vaidhyanathan et al.

(10) Patent No.: US 9,445,148 B2
(45) Date of Patent: Sep. 13, 2016

(54) DIGITAL VIDEO RECORDER (DVR) IMPLEMENTED USING SUPPLEMENTAL DEVICE STORAGE

(71) Applicant: Verizon Patent and Licensing Inc., Arlington, VA (US)

(72) Inventors: Aravind Vaidhyanathan, Chennai (IN); Vijayan Radhakrishnan, Chennai (IN); Sivasubramanian Parthasarathy, Muthialpet (IN); Venkatesan Sriraman, Chennai (IN); Deepak Natarajan, Coimbatore (IN); Kavitha PanneerSelvam, Chennai (IN); JanardhanReddy Tripuram, Nalgonda (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/470,598

(22) Filed: Aug. 27, 2014

(65) Prior Publication Data
US 2016/0066031 A1  Mar. 3, 2016

(51) Int. Cl.
| H04N 7/18 | (2006.01) |
|---|---|
| H04N 21/436 | (2011.01) |
| H04N 21/41 | (2011.01) |
| H04N 21/433 | (2011.01) |
| H04N 21/4367 | (2011.01) |
| H04N 21/4363 | (2011.01) |
| H04N 21/472 | (2011.01) |

(52) U.S. Cl.
CPC .... *H04N 21/43622* (2013.01); *H04N 21/4126* (2013.01); *H04N 21/4135* (2013.01); *H04N 21/4334* (2013.01); *H04N 21/4367* (2013.01); *H04N 21/43637* (2013.01); *H04N 21/47217* (2013.01)

(58) Field of Classification Search
CPC ........... H04N 21/173; H04N 21/4126; H04N 21/4135
USPC ................................... 725/80, 100
See application file for complete search history.

(56) References Cited

U.S. PATENT DOCUMENTS

| 8,559,795 B2* | 10/2013 | Wachtfogel | H04N 5/76 386/239 |
|---|---|---|---|
| 2008/0040750 A1* | 2/2008 | Taylor | G11B 27/034 725/55 |
| 2008/0046954 A1* | 2/2008 | Bhogal | H04N 7/163 725/134 |

* cited by examiner

*Primary Examiner* — Olugbenga Idowu (57) ABSTRACT

Techniques described herein may use a computing device, such as a smartphone or tablet computer, that is attached to a local area network, as a storage device or supplemental storage device for a set-top box (STB) that is also attached to the local area network. In one implementation, the STB may stream, to the computing device, video content corresponding to a television program that is being viewed by a user of the STB. In response to a command such as a rewind or unpause operation, the STB may request the video content from the computing device; receiving the requested video content from the computing device; and satisfying the unpause or rewind operation, based on the received video content.

20 Claims, 9 Drawing Sheets

DIGITAL VIDEO RECORDER (DVR) IMPLEMENTED USING SUPPLEMENTAL DEVICE STORAGE

BACKGROUND

A Set-Top Box (STB) or Set-Top Unit (STU) is an information appliance device that may include a television tuner that receives an external signal and that extracts ("tunes") television content, for display by a television or other display device, from the external signal. Some STBs may additionally include Digital Video Recording (DVR) capabilities. These STBs (referred to as 0DVR STBs herein) may include non-volatile storage, such as a disk drive or flash drive, that allows the DVR STB to buffer (record) television content. Buffering of television content for later playback and viewing may enable a user to record selected television content. Additionally, automatically buffering television content that is being watched by the may user enable the DVR STB to offer on-demand pausing and rewinding of the television content.

Recoding of video content, such as television content, can be storage intensive. Some STBs, to reduce cost and/or power consumption, may not include a storage device, and may thus be unable to offer record, pause, or rewind functionality (i.e., these STBs may be non-DVR STBs). Additionally, DVR STBs, because of the finite size of the storage device, may have a limited ability to provide record, pause, or rewind functionality.

DETAILED DESCRIPTION OF PREFERRED EMBODIMENTS

The following detailed description refers to the accompanying drawings. The same reference numbers in different drawings may identify the same or similar elements.

Techniques described herein may automatically detect when a computing device can be paired with a STB. In one implementation, the computing device may be a mobile device such as a smartphone, tablet computer, or other personal content device. The computing device may pair with the STB whenever the computing device and the STB are connected to the same short range wireless network (e.g., a Wi-Fi network) or whenever the computing device and the STB are close enough to one another to directly connect via a short range wireless connection (e.g., a Wi-Fi Direct or Bluetooth®) connection. The STB may encrypt television content being viewed and transmit the encrypted television content to the computing device for storage. In response to, for example, a pause or rewind request that is received from a user watching television, the STB may retrieve the content from the computing device and use the retrieved content to implement the pause or rewind request. In this manner, a STB that does not include storage that allows the STB to intrinsically act as a DVR STB, may nevertheless provide DVR functionality.

Figure 1:
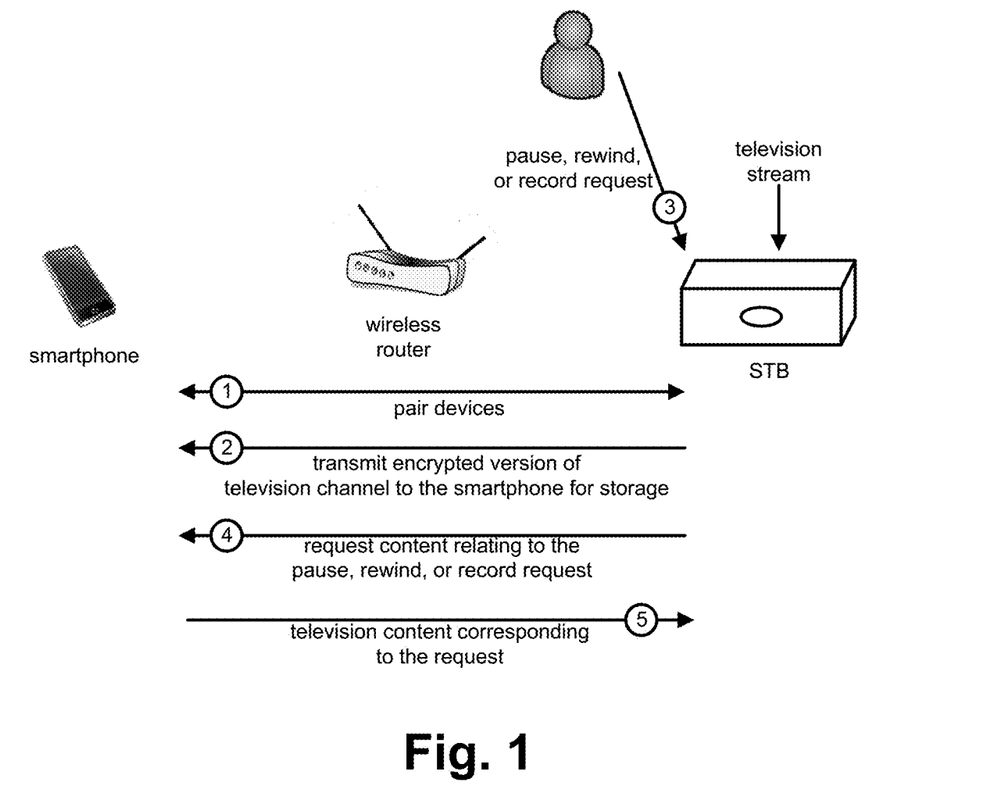
FIG. 1 is diagram illustrating an example of an overview of concepts described herein.

FIG. 1 is diagram illustrating an example of an overview of concepts described herein. As illustrated, a computing device (e.g., a smartphone of a user) may be connected to the same local area network as a STB (e.g., a non-DVR STB). For example, a user residence may receive television service and network connectivity (e.g. the Internet) from a telecommunications company. A wireless router, such as a Wi-Fi router, may provide wireless connectivity to the smartphone and the wireless router may be connected, either wirelessly or through a wired connection, to STBs in the user residence. The smartphone and the STB may thus be capable of communicating, with one another, through the wireless router.

As shown in FIG. 1, when the smartphone comes into communication range of the STB, such as when the smartphone attaches to a wireless local area network associated with the user's residence (e.g., when the smartphone attaches to the Wi-Fi associated with the user residence), the smartphone and the STB may pair with one another (at 1, "pair devices"). Pairing of the devices may include establishing a communication session between the devices. The smartphone may include non-volatile storage, such as flash memory-based storage. The STB may begin to transmit an encrypted stream of the television channel currently being viewed, by the user, to the smartphone (at 2, "transmit encrypted version of television channel to the smartphone for storage"). The smartphone may accordingly act as an external storage device for the STB.

Assume that the user, while watching television, decides to pause, rewind, or record the television channel being viewed (at 3, "pause, rewind, record request"). The STB may receive the pause, rewind, or record request, such as via an infrared remote control command, and in response, may request the content relating to the pause, rewind, record request from the smartphone (at 4, "request content relating to the pause, rewind, or record request"). For a pause request, for example, the STB may freeze the television display at the current image (while continuing to transmit encrypted version of the television channel for mobile device), and when the user unpauses playback of the television channel, the STB may begin to receive, from the mobile device, the stored content beginning at the paused location of the television channel. For a rewind request, for example, the STB may request that the smartphone begin to stream content, to the STB, starting from the current playback location and progressing backwards in time. Similarly, for a request relating to beginning to play a previously recorded program, the STB may request the content corresponding to the previously recorded program. The smartphone may receive the request and may begin to transmit previously stored television content corresponding to the request (at 5, "television content corresponding to the request"). The STB may thus receive the content and may begin to output the television content, to a television or other display device, in a manner that implements the user command (e.g., a pause, unpause, rewind, or record command).

Figure 2:
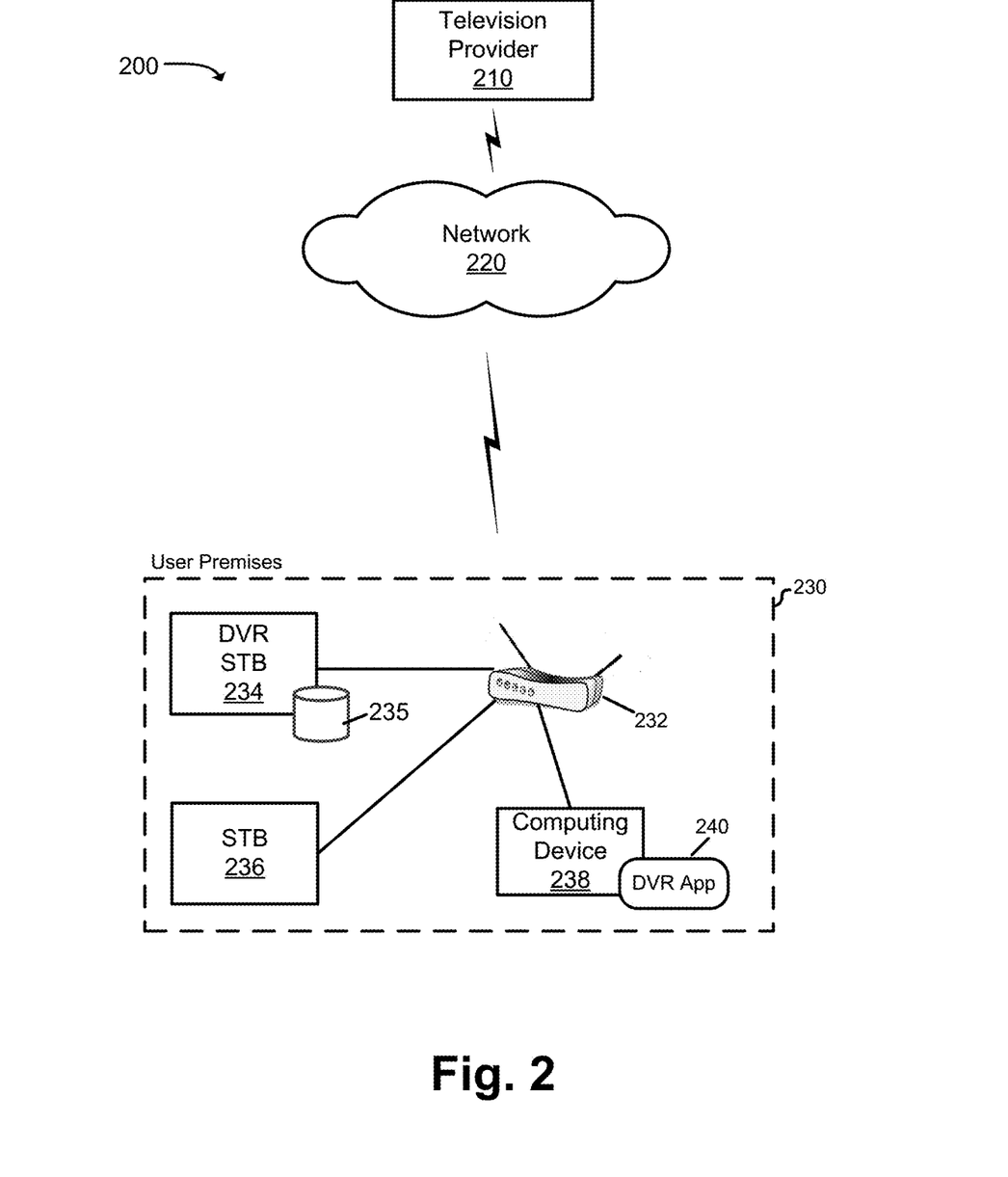
FIG. 2 is a diagram of an example environment in which systems and/or methods described herein may be implemented.

FIG. 2 is a diagram of an example environment 200, in which systems and/or methods described herein may be implemented. As shown in FIG. 2, environment 200 may include television provider 210, network 220, and user premises 230.

Television provider 210 may represent a cable television provider, satellite television provider, an over-the-air antenna television provider, or other entity that provides television channels to user residence 230. In some situations, television provider 210 may include a telecommunications company that also provides other services to user residence 230, such as a wide area network (WAN) connectivity (e.g., Internet), cellular voice and data services, telephone services, and/or other services.

Network 220 may include one or more wired and/or wireless networks. For example, network 220 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 220 may include a local area network (LAN), a wireless LAN (WLAN), a wide area network (WAN), a metropolitan network (MAN), the Public Switched Telephone Network (PSTN), an ad hoc network, a managed Internet Protocol (IP) network, an intranet, the Internet, a fiber optic-based network, and/or a combination of these or other types of networks.

User premises 230 may include a premises associated with a customer of television provider 210. User residence 230, as used herein, may refer to a residence (e.g., a home), a business premises, or some other premises associated with a television account by television provider 210. As illustrated, user premises 230 may include one or more computing and/or communication devices, such as wireless router 232, DVR STB 234, STB 236 (e.g., a non-DVR STB), and computing device 238.

Wireless router 232 may include a device that performs routing functions as well as the functions of a wireless access point. For example, wireless router may implement an access point for a Wi-Fi network. Wireless router 232 may include a Digital Subscriber Line (DSL) modem, a Data Over Cable Service Interface Specification (DOCSIS) modem, a Long Term Evolution (LTE) modem, and/or a fiber optic modem. Additionally, wireless router 232 may include one or more Network Interface Cards (NICs) and/or Wireless Network Interface Cards (WNICs).

DVR STB 234 may include a STB that includes DVR capabilities, such as the ability to pause television channels, rewind television channels, and/or record and later playback television channels/programs. DVR STB 234 may include one or more tuners to receive a television signal from television provider 210 and to extract (tune) a particular television channel from the television signal. DVR STB 234 may be connected to wireless router 232 through a wired connection, such as a coaxial cable connection using Multimedia over Coax Alliance (MoCA) standards, and/or a wireless (e.g., Wi-Fi) connection. In some implementations, DVR STB 234 may include components to directly connect, through wireless short range connections, to computing device 238. For example, DVR STB 234 may include wireless interface to implement a Bluetooth® connection, Wi-Fi Direct connection, or other type of wireless connection.

To implement the DVR functions, DVR STB 234 may include non-volatile storage 235. Non-volatile storage 235 may include, for example, a hard disk drive or flash memory. DVR STB 234 may use non-volatile storage 235 as a buffer to store television content. Because non-volatile storage 235 is finite, it may be desirable to use computing device as a supplemental storage device for DVR STB 234.

STB 236 may include one or more tuners to receive a television signal from television provider 210 and to tune a particular television channel from the television signal. STB 236 may not include sufficient non-volatile storage to natively provide DVR functionality. Computing device 238 may provide storage for STB 236 to allow STB 236 to provide DVR functionality. STB 236 may be connected to wireless router 232 through a wired connection, such as a coaxial cable connection using MoCA standards, and/or a wireless (e.g., Wi-Fi) connection. In some implementations, STB 236 may include components to directly connect, through wireless short range connections, to computing device 238. For example, STB 236 may include wireless interface to implement a Bluetooth® connection, Wi-Fi Direct connection, or other type of wireless connection. Computing device 238 may include a computing and communication device that can be used to provide storage for STB 236 or supplemental storage for DVR STB 234. For example, computing device 238 may correspond to a personal computing device of a user associated with user premises 230, such as smartphone, a tablet computing device, or a laptop. Computing device 238 may include wireless adapters that enable computing device 238 to connect to short range wireless networks, such as wireless networks based on Wi-Fi, Bluetooth®, or other wireless standards. A wireless adapter of computing device 238 may attach to a wireless network through wireless router 232.

Computing device 238 may implement an application, illustrated as DVR application ("app") 240. DVR application 240 may be an application that is installed by a user of computing device 238 and/or an application that is incorporated into computing device 238 during the manufacture and/or provisioning of computing device 238. DVR application 238 may generally operate to communicate with DVR STB 234 and/or STB 236 to enable the storing of television content, at computing device 238, on behalf of DVR STB 234 and/or STB 236. The operation of computing device 238 with respect to the storing of television content will be described in more detail below.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
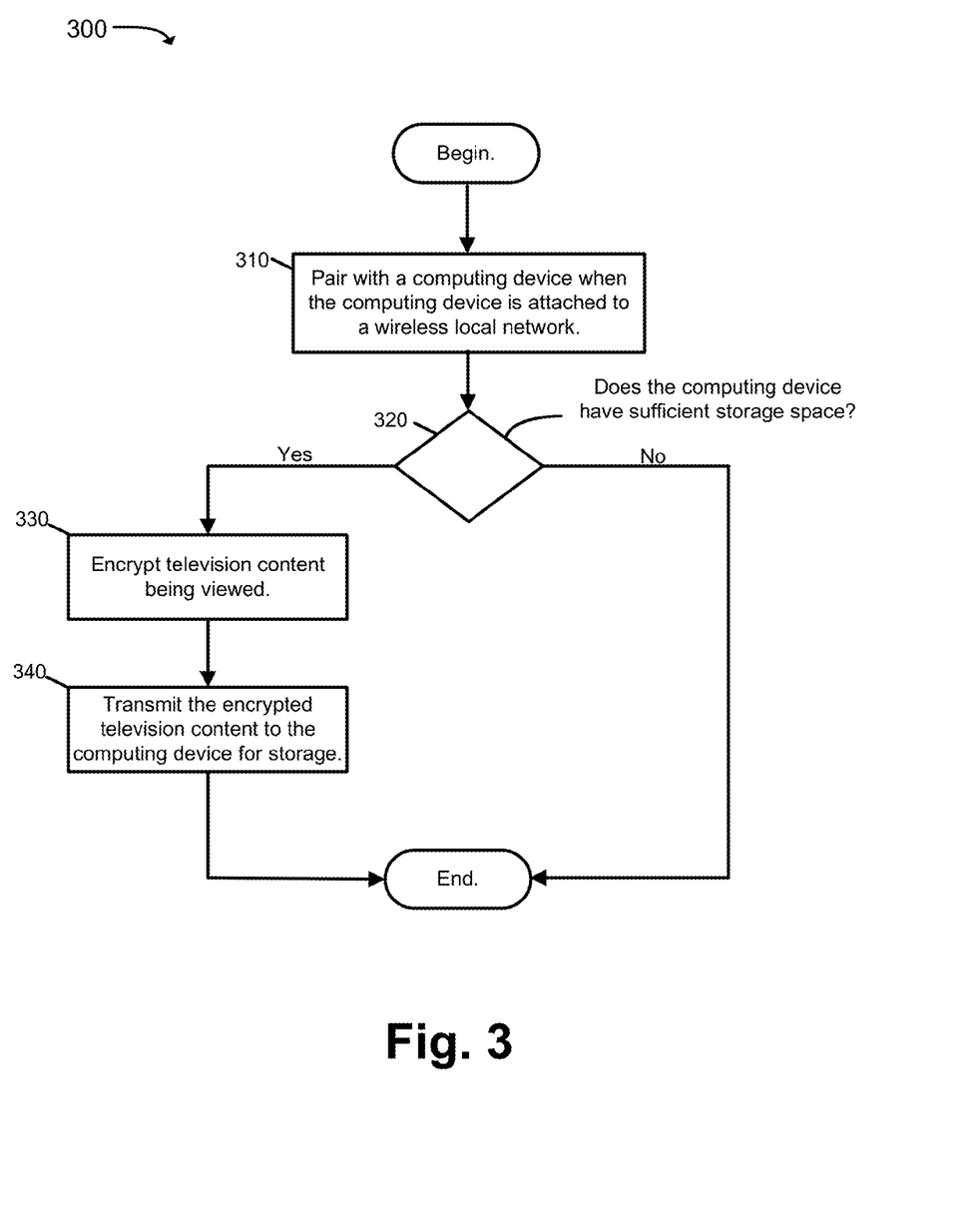
FIGS. 3 and 4 are flow charts illustrating example processes relating to storing television content, by a STB, on a supplemental storage device.

FIG. 3 is a flow chart illustrating an example of a process 300 relating to storing television content, by a STB, on a supplemental storage device (e.g., computing device 238), to enable DVR rewind or pause functionality (or other similar DVR functionality, such as fast forward). Process 300 may be performed by, for example, DVR STB 234 or STB 236, and use computing device 238 as the supplemental storage device. DVR STB 234 may store television content at computing device 238 in order to increase the effective capacity of non-volatile storage 235. STB 236 may store television content at computing device 238 in order to enable DVR functionality such as rewind or pause functions.

Process 300 may include pairing with the computing device when the computing device is attached to a wireless local network (block 310). As previously mentioned, DVR STB 234 and/or STB 236 may be connected to a LAN associated with user premises 230, such as a LAN that includes a wireless section (e.g., enabled by wireless router 232) and/or a wired section (e.g., Ethernet cabling and/or MoCA-based cabling). DVR STB 234 and/or STB 236 may communicate with DVR application 240, when computing device 238 is attached to the LAN, to determine whether computing device 238 is available to store television content.

Process 300 may further determine whether computing device 238 has sufficient storage space (block 320). Sufficient storage space may be determined based on whether computing device 238 has enough free storage space to perform buffering for DVR rewind and/or pause functions. In one implementation, the determination of whether there is sufficient storage space may be based on a predefined threshold that is set by the user of computing device 238. For example, a user may specify, via DVR application 240 or via DVR STB 234/STB 236, that computing device 238 only be used as a supplemental storage device when computing device 238 has at least 5 gigabyte (GB) of free storage space. The determination of whether computing device 238 includes sufficient storage space may be performed via a query, from DVR STB 234/STB 236, to computing device 238.

When the computing device is determined to have sufficient storage space (block 320—YES), process 300 may further include encrypting the television content that is currently being viewed (block 330). DVR STB 234/STB 236 may encrypt the television content to ensure that unauthorized viewing or copying of the television content, such as by computing device 238, cannot be performed. In some implementations or for some television content, preventing viewing of the television content at a device, other than DVR STB 234/STB 236, may not be a concern. In this situation, encrypting the television content may be omitted.

Process 300 may further include transmitting the encrypted content to the computing device for storage of the television content (block 340). In one implementation, the encrypted television content may be streamed to computing device 238. Computing device 238 may store the received television content at local storage associated with computing device 238.

Figure 4:
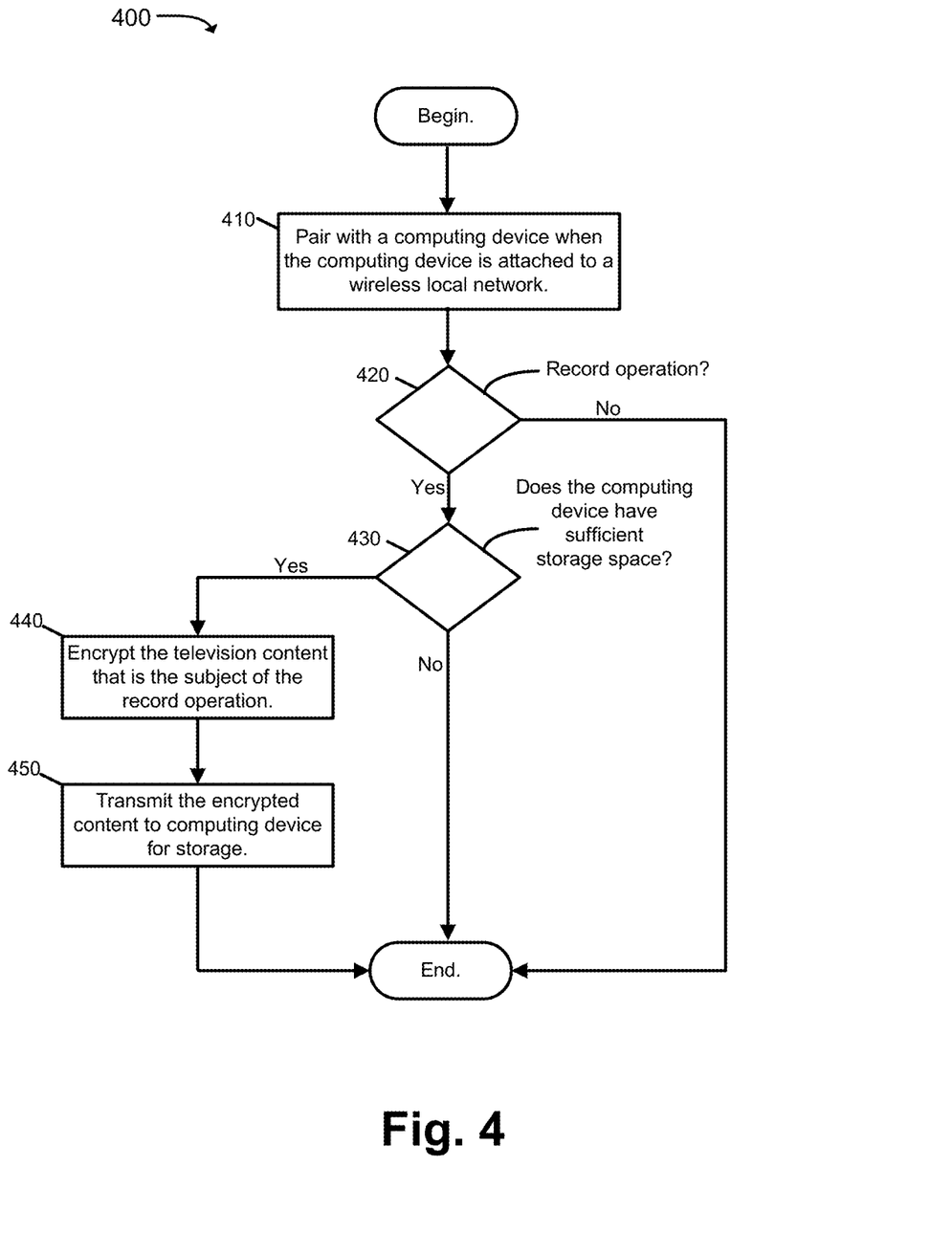

FIG. 4 is a flow chart illustrating an example of a process 400 relating to storing television content, by a STB, on a supplemental storage device, to enable DVR record functionality. Process 400 may be performed by, for example, DVR STB 234 or STB 236, and use computing device 238 as the supplemental storage device.

Process 400 may include pairing with the computing device when the computing device is attached to a wireless local network (block 410). The operations of block 410 may be similar to those of block 310 (FIG. 3). For example, DVR STB 234 and/or STB 236 may communicate with DVR application 240, when computing device 238 is attached to a LAN, to determine whether computing device 238 is available to store television content.

Process 400 may further include determining whether a record operation has been initiated (block 420). The record operation may refer to a DVR record operation in which a user specifies a particular television program, that is either currently playing or will be playing in the future, to be recorded. The user may specify the record operation using, for example, a remote control device that is compatible with DVR STB 234 or STB 236, or using another device (e.g., a smartphone, a tablet, etc.).

When a record operation is determined (block 420—YES), process 400 may further include determining whether the computing device has sufficient storage space (block 430). The operations corresponding to block 430 of process 400 may be similar to block 320 of process 300 (FIG. 3). For instance, sufficient storage space may be determined based on whether computing device 238 has enough free storage space to record the desired television program. In one implementation, the determination of whether there is sufficient storage space may be based on a predefined threshold that is set by the user of computing device 238.

When the computing device is determined to have sufficient storage space (block 430—YES), process 400 may further include encrypting the television content that is currently being viewed (block 440). The operations corresponding to block 440 of process 400 may be similar to those of block 330 of process 300 (FIG. 3). For example, DVR STB 234/STB 236 may encrypt the television content to ensure that unauthorized viewing or copying of the television content, such as by computing device 238, cannot be performed. In some situations, encrypting of the television content may be omitted.

Process 400 may further include transmitting the encrypted content to the computing device for storage of the television content (block 450). In one implementation, the encrypted television content may be streamed to computing device 238. Computing device 238 may store the received television content at local storage associated with computing device 238.

Figure 5:
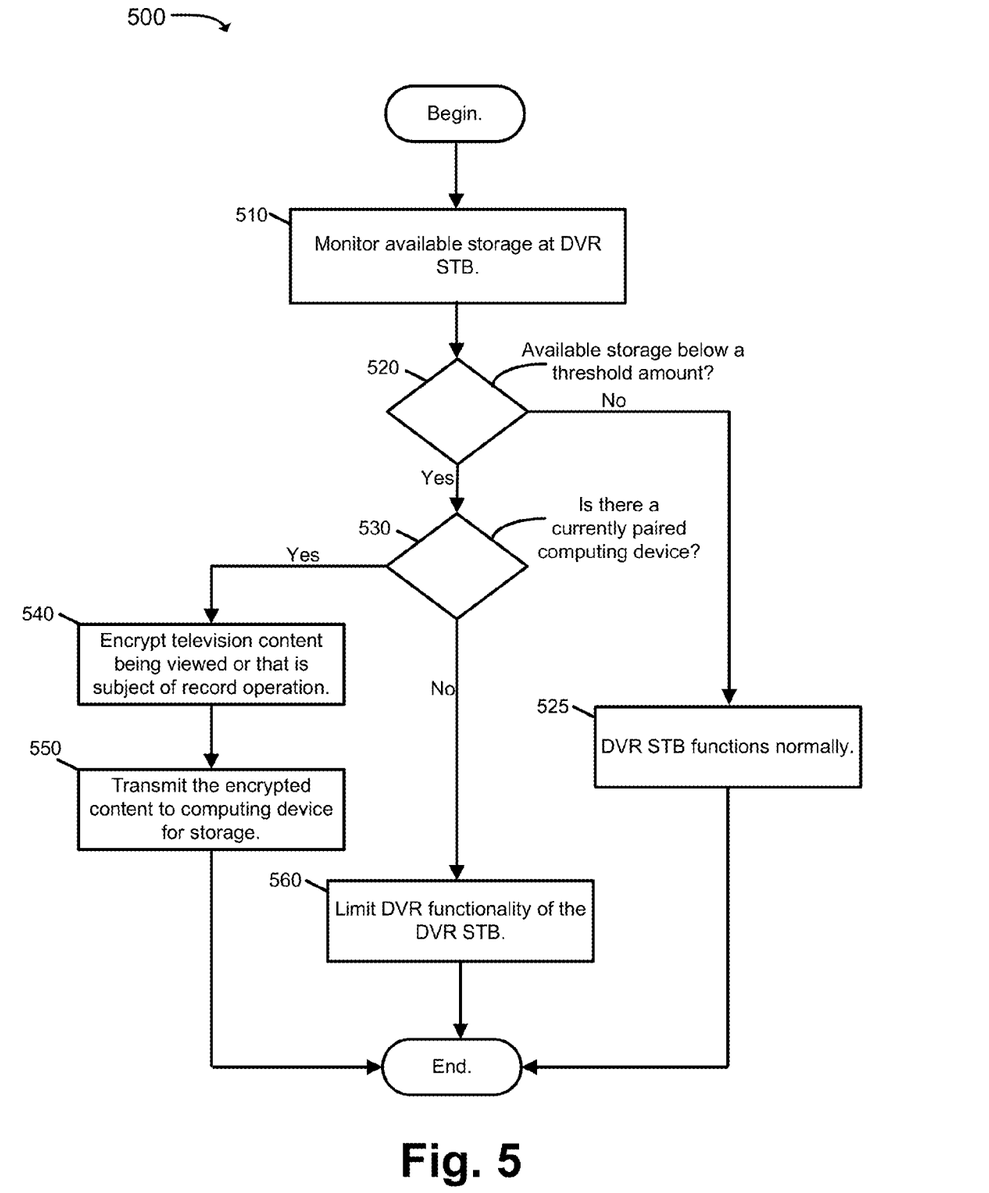
FIG. 5 is a flow chart illustrating an example of a process relating to storing television content, by a DVR STB, on a supplemental storage device.

FIG. 5 is a flow chart illustrating an example of a process 500 relating to storing television content, by a DVR STB, on a supplemental storage device. Process 500 may be performed by, for example, DVR STB 234, and use computing device 238 as the supplemental storage device.

Process 500 may include monitoring the available storage at the DVR STB (block 510). For example, DVR STB 234 may include one or more hard disk drives, or other storage devices that are used to store television content. DVR STB 234 may monitor the available storage space associated with the hard disk drives.

Process 500 may further include determining when the available storage space falls below a threshold amount (block 520). The available storage space falling below the threshold amount may indicate that there is insufficient storage space to continue to record new television content.

When the available storage space does not fall below the threshold amount (block 520—No), the DVR STB may continue to function normally (block 525). That is, DVR STB 234 may continue to implement DVR operations locally (e.g., using a local hard disk drive). When the available storage space falls below the threshold amount (block 520—Yes), process 500 determines whether there is currently a paired computing device (block 530). When there is no paired computing device to act as supplemental storage, the DVR functionality of the DVR STB may be limited (block 560). For example, DVR STB 234 may not record additional programs and may present an error message to the user when the user attempts to initiate a new recording. When there is a pair device (block 530—Yes), computing device 238 may be used as a supplemental computing device for the DVR STB. In particular, the DVR STB may encrypt television content that is being presented or that is the subject of a record operation (block 540). The encrypted television content may be transmitted and stored at the computing device (block 550).

Figure 6A:
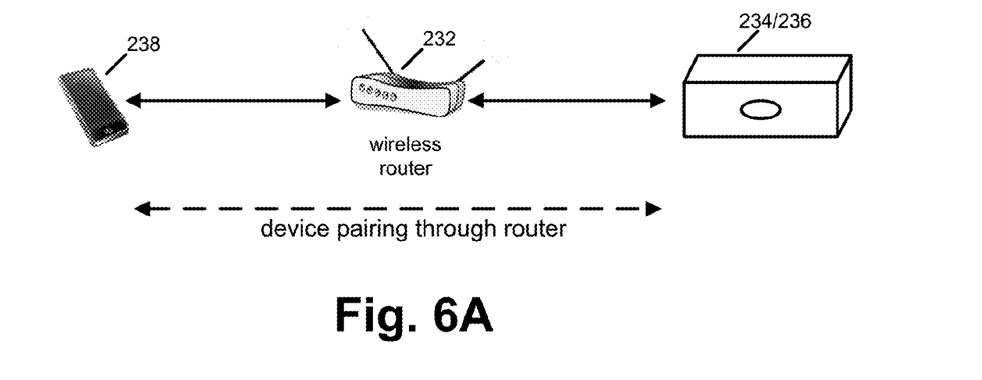
FIGS. 6A and 6B are diagrams illustrating examples of pairing of computing device.
Figure 6B:
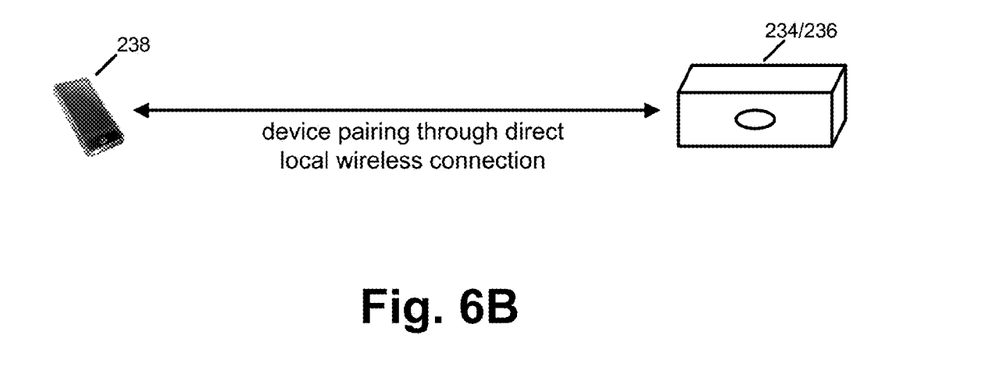

FIGS. 6A and 6B are diagrams illustrating examples of pairing of computing device 238 with DVR STB 234 and/or STB 236, as performed in blocks 310, 410, and 530 (FIGS. 3, 4, and 5, respectively). As illustrated in FIG. 6A, computing device 238 and DVR STB 234/STB 236 may be paired with one another through wireless router 232. For example, computing device 238 and DVR STB 234/STB 236 may each connect through a wired and/or wireless LAN (e.g., a Wi-Fi LAN) associated with user premises 230. Computing device 238 and DVR STB 234/STB 236 may discover one another, such as by direct discovery of one another (e.g., by querying devices attached to the LAN) or by using an intermediary server (e.g., a discover server connected to network 220 that functions to facilitate discovery of devices connected to the same LAN). In the example of FIG. 6A, wireless router 232 may act as an intermediary switching/routing device for communications between computing device 238 and DVR STB 234/STB 236.

As illustrated in FIG. 6B, computing device 238 and DVR STB 234/STB 236 may pair with one another by directly (e.g., without using a wireless access point) using short range wireless communications. For example, computing device 238 and DVR STB 234/STB 236 may detect when the devices come within range of one another and may establish a communication session. As previously discussed, direct pairing with one another be performed using, for example, Bluetooth® communications, Wi-Fi Direct communications, or other types of direct short range wireless communication standards.

Figure 7:
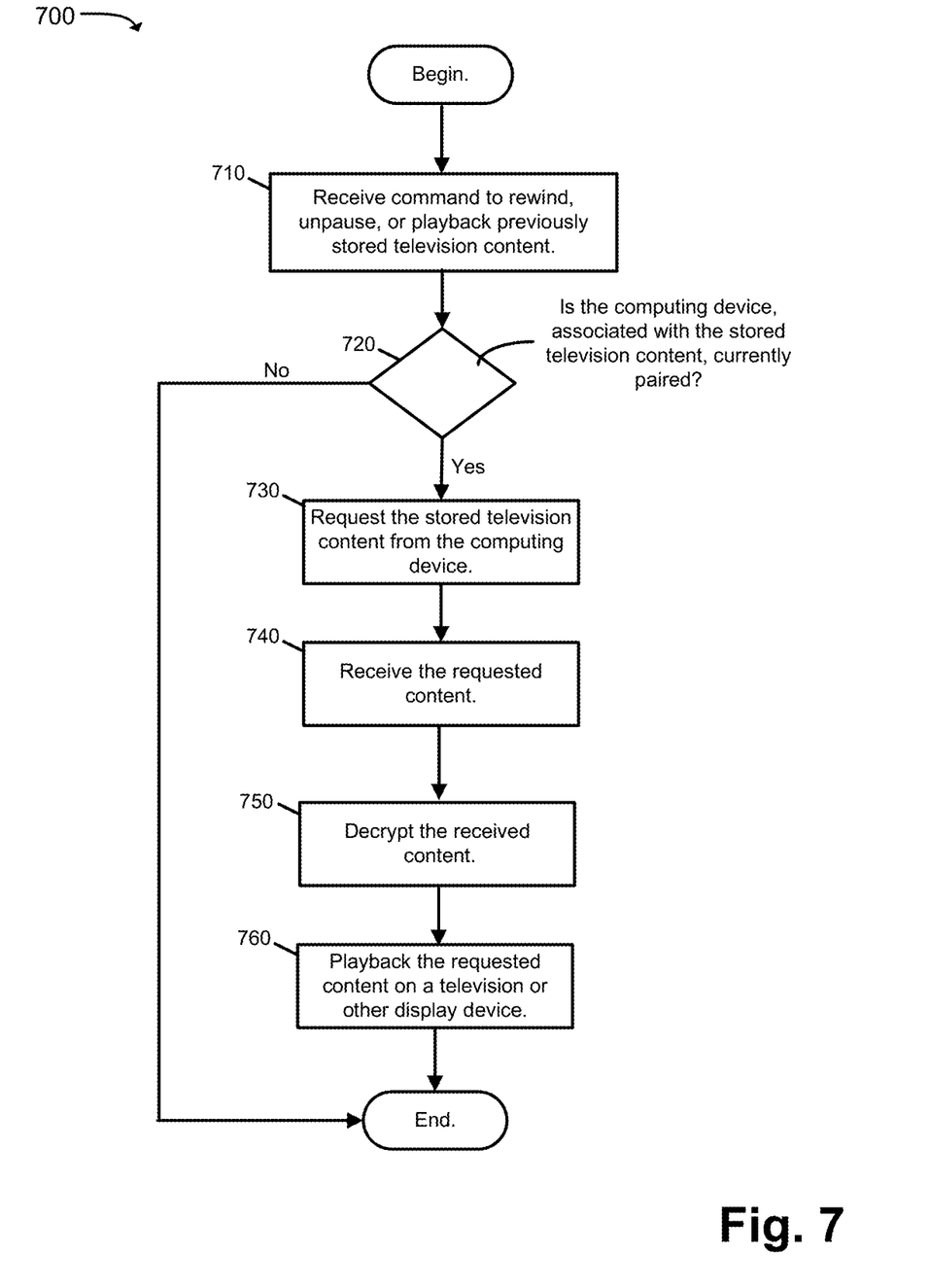
FIG. 7 is a flow chart illustrating an example of a process relating to providing playback of previously stored television content.

FIG. 7 is a flow chart illustrating an example of a process 700 relating to providing playback of previously stored television content. Process 700 may be performed by, for example, DVR STB 234 or STB 236.

Process 700 may include receiving a command to rewind, unpause, or playback (including fastforward) previously stored television content (block 710). As previously mentioned, a user may input commands to DVR STB 234/STB 236 using, for example, a remote control device or another device (e.g., a smartphone).

Process 700 may further include determining whether the computing device, associated with to the stored television content, is currently paired with the STB (or DVR STB) (block 720). When the computing device is determined to be paired (block 720—Yes), process 700 may further include requesting the stored television content from the computing device (block 730). For instance, DVR STB 234/STB 236 may send a request to computing device 238 indicating a portion of the previously stored content that is needed to satisfy the rewind, unpause, or playback command. Computing device 238 may respond to the request for the stored content by transmitting the requested content to DVR STB 234/STB 236. The transmitted content may thus be received (block 740).

Process 700 may further include decrypting the received content (block 750). DVR STB 234/STB 236 may decrypt the received content using a decryption technique corresponding to one that was previously used to encrypt the content before storing the content at computing device 238.

Process 700 may further include playing back the requested content on a television or other display device (block 760). For example, for a rewind command, the requested content may be television content that occurs prior (e.g., television content in a ten second window prior to the current playback location). DVR STB 234/STB 236, upon receiving the requested content, may play the content back so that the content is displayed backwards in time. For an unpause command, the requested content may be television content that occurs after the paused location (e.g., television content in a ten second window beginning at the current playback location). DVR STB 234/STB 236, upon receiving the requested content, may play the content back. For a command to playback previously recorded content, the content request may include identification of the content and an indication of the portion of the content to transmit.

Figure 8:
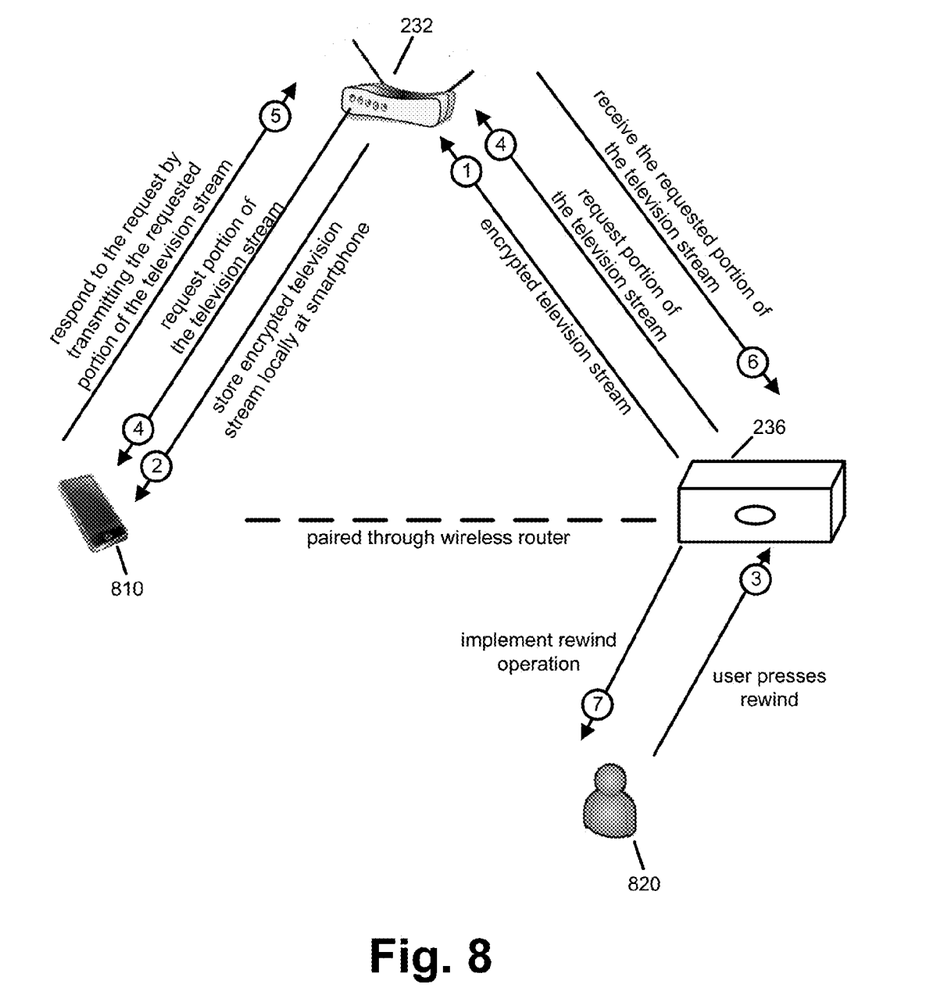
FIG. 8 illustrates a signal flow diagram of example operations relating to using a computing device in a user premises as a supplemental storage device for a STB.

FIG. 8 illustrates a signal flow diagram of example operations relating to using a computing device in a user premises as a supplemental storage device for a STB. In this example, assume user premises 230 includes STB 236 (a non-DVR STB). Computing device 238 may be a smartphone 810 that is carried by user 820. Further, assume user 820 is watching television using STB 236. Smartphone 810 and STB 236 may both be connected, through wireless router 232, to a LAN associated with the user premises. STB 236 may automatically detect the presence of smartphone 810 on the LAN and may thus pair with smartphone 710.

The television channel that is being viewed by user 820 or tuned by STB 236 may be encrypted and streamed, by STB 236, to smartphone 810. As illustrated, the encrypted and streamed television channel may be transmitted through wireless router 232 (at 1, "encrypted television stream") to smartphone 810 (at 2, "store encrypted television stream locally at smartphone").

At some point, user 820 may wish to rewind the television channel being viewed. User 820 may indicate, such as through a remote control device, that a rewind operation is desired (at 3, "user presses rewind"). In response, STB 236 may request a portion of the encrypted television stream that is stored at smartphone 810 (at 4, "request portion of the television stream"). The request may include, for example, an indication of the portion of the stored television stream that is requested, such as by including a time range or list of index values that reference one or more segments of the encrypted television stream. Smartphone 810 may respond to the request (at 5, "respond to the request by transmitting the requested portion of the television stream"). STB 236 may correspondingly receive the requested portion of the television stream (at 6, "receive the requested portion of the television stream"). STB 236 may decrypt the requested portion of the television stream and output a television signal that implements the rewind operation (at 7, "implement rewind operation").

Figure 9:
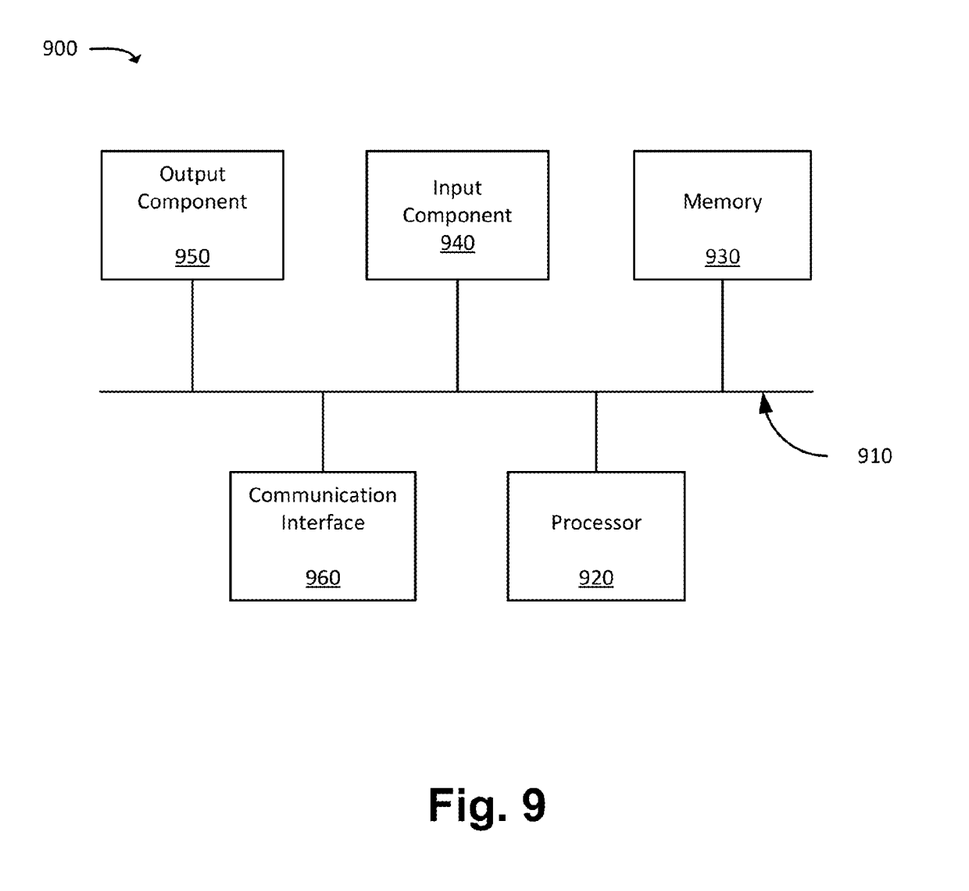
FIG. 9 is a diagram of example components of a device.

FIG. 9 is a diagram of example components of device 900. One or more of the devices described above (e.g., with respect to FIGS. 1, 2, 6A, 6B, and/or 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may include processing circuitry to interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3, 4, 5, and 7, the order of the blocks may be modified in other implementations. Further, non-dependent blocks may be performed in parallel. Additionally, while a series of signals has been described with regard to FIG. 8, the order of the signals may be modified in other implementations. Also, non-dependent signals may be sent and/or received in parallel. In some implementations, additional signals may be transmitted before, after, or in between the described signals.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
pairing, by a set-top box (STB) that does not include sufficient storage to natively support Digital Video Recorder (DVR) functionality, including DVR pause and rewind operations, with a smartphone or tablet computing device, when the smartphone or tablet computing device is connected to a local area network (LAN) associated with the STB;

determining, by the STB, whether the smartphone or tablet computing device has sufficient free storage space to act as a storage device for the STB, and enabling, when the smartphone or tablet computing device has sufficient free storage space to act as a storage device for the STB, DVR functionality for the STB;

tuning, by the STB, to a television program that is provided by a television provider, the tuning including extracting video content, corresponding to the television program, from a television signal;

streaming, by the STB and to the smartphone or tablet computing device, the extracted video content corresponding to the television program, the streaming being performed via the LAN;

receiving, by the STB, a command to perform an unpause or rewind operation;

requesting, by the STB and in response to the received unpause or rewind operation, the video content from the smartphone or tablet computing device;

receiving, by the STB, the requested video content from the smartphone or tablet computing device; and satisfying, by the STB, the unpause or rewind operation, based on the received video content, to provide the DVR functionality at the STB.

2. The method of claim 1, further comprising:

encrypting the video content before streaming the video content to the computing device such that the encrypted video content is not viewable at the computing device.

3. The method of claim 1, wherein determining whether the smartphone or tablet computing device has sufficient free storage space includes:

querying the smartphone or tablet computing device, over the LAN, as to whether the smartphone or tablet computing device has sufficient free storage.

4. The method of claim 1, further comprising:

determining, before streaming the video content, whether the smartphone or tablet computing device has at least a threshold level of free storage space; and streaming the video content only when the smartphone or tablet computing device is determined to have at least the threshold level of free storage space.

5. The method of claim 1, wherein pairing the STB with the smartphone or tablet computing device is performed via a wireless Wi-Fi router.

6. The method of claim 1, wherein pairing the STB with the smartphone or tablet is performed via a direct wireless connection between the STB and the smartphone or tablet computing device.

7. The method of claim 1, further comprising:

receiving a command to playback a previously recorded television program;

requesting, in response to the received command, video content, from the smartphone or tablet computing device, corresponding to the previously recorded television program;

receiving, from the smartphone or tablet computing device, the requested video content corresponding to the previously recorded television program; and playing back the previously recorded television program, based on the received video content corresponding to the previously recorded television program.

8. A set-top box (STB) that does not include sufficient storage to natively support Digital Video Recorder (DVR) functionality, the STB comprising processing circuitry to:

pair with a computing device when the computing device is connected to a wireless local area network (LAN), associated with the STB;

determine whether the computing device has sufficient free storage space to act as a storage device for the STB, and enabling, when the computing device has sufficient free storage space to act as a storage device for the STB, DVR functionality for the STB;

tune, by the STB, to a television program that is provided by a television provider, the tuning including extracting video content, corresponding to the television program, from a television signal;

stream, to the computing device, the extracted video content corresponding to the television program, the streaming being performed via the LAN;

receive a command to perform an unpause or rewind operation;

request, in response to the received command, the video content from the computing device;

receive the requested video content from the computing device; and satisfy the unpause or rewind operation, based on the received video content, to provide the DVR functionality at the STB.

9. The STB of claim 8, wherein the processing circuitry is further to:

encrypt the video content before streaming the video content to the computing device such that the encrypted video content is not viewable at the computing device.

10. The STB of claim 8, wherein the computing device includes a smartphone or tablet computer.

11. The STB of claim 8, wherein the processing circuitry is further to:

determine, before streaming the video content, whether the computing device has at least a threshold level of free storage space; and stream the video content only when the computing device is determined to have at least the threshold level of free storage space.

12. The STB of claim 8, wherein pairing the STB with the computing device is performed via a wireless Wi-Fi router.

13. The STB of claim 8, wherein pairing the STB with the computing device is performed via a direct wireless connection between the STB and the computing device.

14. The STB of claim 8, wherein the processing circuitry is further to:

receive a command to playback a previously recorded television program;

request, in response to the received command, video content, from the computing device, corresponding to the previously recorded television program; and receive, from the computing device, the requested video content corresponding to the previously recorded television program; and playing back, by the STB, the previously recorded television program, based on the received video content corresponding to the previously recorded television program.

15. A set-top box (STB) comprising processing circuitry to:

receive a television signal;

extract, via a tuner of the STB, a particular television channel, from the received television signal, to obtain video content;

transmit the video content to a computing device that is attached to a wireless local area network (LAN) to which the STB is attached, the video content being transmitted to the computing device for storage by the computing device, wherein the STB does not include sufficient storage to natively support Digital Video Recorder (DVR) functionality;

request, from the computing device and based on reception of a command relating to DVR functionality, the video content;

receive the requested video content; and play back, based on the command, the received video content, to provide the DVR functionality at the STB.

16. The STB of claim 15, wherein the processing circuitry is further to:

encrypt the video content before transmission to the computing device such that the encrypted video content is not viewable at the computing device; and decrypt the received video content.

17. The STB of claim 15, wherein the processing circuitry is further to:

determine, before transmitting the video content, whether the computing device has at least a threshold level of free storage space; and transmit the video content only when the computing device is determined to have at least the threshold level of free storage space.

18. The STB of claim 15, wherein the computing device includes a smartphone or tablet computer.

19. The STB of claim 15, wherein the command includes an unpause, rewind, or playback command.

20. The STB of claim 15, wherein the processing circuitry is further to:

refrain from transmitting the video content to the computing device when the computing device has less than a threshold level of storage.

* * * * *